Patented Dec. 9, 1941

2,265,425

UNITED STATES PATENT OFFICE 2,265,425

DISAZO DYESTUFFS

Erich Fischer, Bad Soden in Taunus, and Richard Huss, Frankfort-on-the-Main, Germany, assignors to General Aniline & Film Corporation, New York, N. Y., a corporation of Delaware No Drawing. Application October 15, 1940, Serial No. 361,252. In Germany October 24, 1938

6 Claims. (Cl. 260—187)

The present invention relates to disazo dyestuffs; more particularly it relates to the dyestuffs corresponding with the following general formula:

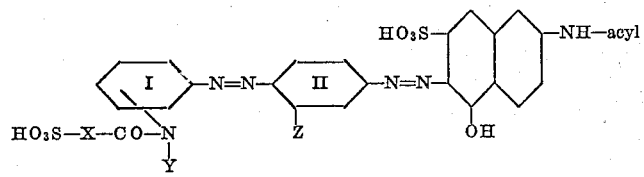

wherein the sulfoacylamino-group stands in meta- or para-position to the azo-group, X stands for an alkyl group, Y for hydrogen or an alkyl group, Z for a methyl or acetylamino group, and wherein the benzene nuclei I and II may contain further substituents which do not lend solubility in water.

We have found that valuable disazo dyestuffs are obtained by coupling a diazo compound of an amino-omega-sulfoacylamino-benzene of the formula:

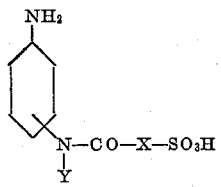

wherein the sulfoacylamino-group stands in meta- or para-position to the amino-group, X stands for an alkyl radical, Y for hydrogen or an alkyl radical, and wherein the benzene nucleus may contain further groups which do not lend solubility in water, with an amine of the benzene series which couples in para-position to the amino-group, with formation of a mono-azo-dyestuff, further diazotizing this mono-azo-dyestuff and coupling this diazo-compound with a 2-acylamino-5-hydroxy-naphthalene-7-sulfonic acid or a substitution product thereof as, for instance, a 1-chloro-2-acylamino-5-hydroxynaphthalene-7-sulfonic acid.

In this manner there are obtained dyestuffs which dye vegetables fibers bluish red to reddish blue tints. In comparison with similar disazo dyestuffs, described in U. S. Patents Nos. 2,026,920 and 1,940,683, the new dyestuffs obtained with application of diazotized amino-omega-sulfoacylaminobenzenes as initial components are distinguished by a better fastness to wet-processing and to perspiration.

The amines used as initial components in the process according to the present invention may be prepared by condensing a nitroamino- or nitromonoalkylamino-benzene with a chloroacyl chloride so as to form the corresponding nitro-(omega - chloroacylamino) - or nitro - (omega - chloroacyl - N - alkylamino) - benzene, then exchanging the chlorine atom for the sulfonic acid group by means of sodium sulfite and subsequently reducing the nitro-group.

The following examples serve to illustrate the invention, but they are not intended to limit it thereto; the parts are by weight, unless otherwise stated:

(1) 23 parts of 1-amino-3-(omega-sulfoacetyl-amino)-benzene are dissolved in 100 parts by volume of water and 45 parts by volume of 2N-caustic soda solution to form a clear solution, to which 6.9 parts of sodium nitrite are added. The mixture is then slowly introduced at 0° C.-3° C. into an aqueous solution of 25 parts by volume of hydrochloric acid of 30 per cent. strength. The solution of the diazo-compound thus obtained is combined with the calculated amount of 1-amino-3-methylbenzene in a feebly acid medium. When the coupling is complete, the monoazo-dyestuff is separated and further diazotized at 15° C. in the usual manner in the presence of hydrochloric acid in excess. The diazo-compound of the monoazo-dyestuff is isolated, made into a paste by means of water and coupled with 2-benzoyl-amino-5-hydroxynaphthalene-7-sulfonic acid in a neutral to bicarbonate-alkaline medium. The disazo-dyestuff obtained is isolated in the usual manner and dried. It dyes cotton in the Glauber's salt bath bluish red tints.

The dyestuff corresponds with the following formula:

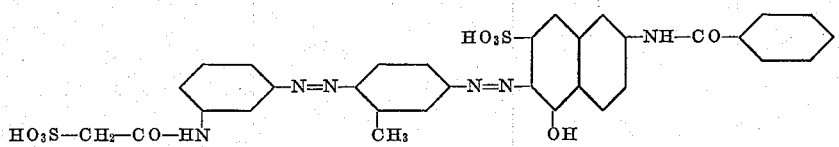

neutral to bicarbonate-alkaline medium with an aqueous solution of the sodium salt of the mixed urea from 2-amino-5-hydroxy-naphthalene-7-sulfonic acid and 1-amino-4-acetylaminobenzene. When the coupling is complete, the dyestuff is isolated and dried. It dyes cotton bluish Bordeaux tints of very good fastness to wet-processing.

(2) 23 parts of 1-amino-3-(omega-sulfoacetylamino)-benzene are diazotized in the manner indicated in Example 1 and coupled with 1-amino-3-methylbenzene in a feebly acid medium. The diazo-compound of this monoazo dyestuff obtained as described in Example 1, is coupled, while intensely stirring, at 0° C.–3° C. in a neutral to bicarbonate-alkaline medium with a solution of the sodium salt of the mixed urea from 2-amino-5-hydroxynaphthalene-7-sulfonic acid and 1-amino-4-acetylaminobenzene. The dyestuff obtained dyes cotton clear, very bluish red tints of very good fastness to wet-processing.

(3) 23 parts of 1-amino-4-(omega-sulfoacetylamino)-benzene are dissolved in 100 parts by volume of water and 50 parts by volume of a sodium carbonate solution of 10 per cent strength. 6.9 parts of sodium nitrite are then added to the solution and the mixture is slowly introduced, while stirring, at 0° C., into hydrochloric acid in excess. The diazo-compound obtained which is partly precipitated, is then coupled with the calculated amount of 1-amino-3-methylbenzene in a feebly acid medium. When the coupling is complete, the monoazo dyestuff is separated and transformed in the usual manner into the diazo compound in the presence of hydrochloric acid in excess. The diazo compound obtained is then coupled, while intensely stirring, at 0° C., in a (4) 23 parts of 1-amino-4-(omega-sulfoacetylamino)-benzene are transformed into the diazo compound in the manner indicated in Example 3. The diazo compound obtained is coupled with the calculated amount of 1-amino-2.3-dimethylbenzene in a feebly acid medium. When the coupling is complete, the monoazo dyestuff is diazotized at 15° C. in the usual manner with the calculated amount of sodium nitrite in the presence of hydrochloric acid in excess. The diazo-compound obtained is then combined at 0° C.–5° C. in a neutral to bicarbonate-alkaline medium with an aqueous solution of the sodium salt of 2-acetylamino-5-hydroxynaphthalene-7-sulfonic acid. When the coupling is complete, the disazo-dyestuff is filtered with suction and dried. It dyes cotton Bordeaux tints of good fastness to wet-processing.

The following table indicates the shades of a number of other disazo dyestuffs obtainable by this invention which have similar properties of fastness:

| | Diazo component | Middle component | End component | Shade |
|---|---|---|---|---|
| 1 | 1-amino-3-(omega-sulfoacetylamino)-benzene. | 1-amino-3-methyl-benzene | 2-(benzoyl-amino-4'-benzoyl-amino)-5-hydroxy-naphthalene-7-sulfonic acid. | Bluish-red. |
| 2 | 1-amino-3-(omega-sulfoacetylamino)-4-chlorobenzene. | do | 5-hydroxy-7-sulfo-2-naphthyl-urea | Do. |
| 3 | 1-amino-3-(omega-sulfoacetylamino)-5-chlorobenzene. | do | Mixed urea from 2-amino-5-hydroxy-naphthalene-7-sulfonic acid and 1-amino-4-acetyl-aminobenzene. | Do. |
| 4 | 1-amino-3-(omega-sulfoacetylamino)-6-chlorobenzene. | do | do | Do. |
| 5 | 1-amino-3-(omega-sulfoacetyl-N-methylamino)-benzene. | do | do | Do. |
| 6 | 1-amino-3-(omega-sulfopropionylamino)-benzene. | do | 2-(benzoylamino-4'-benzoylamino)-5-hydroxynaphthalene-7-sulfonic acid. | Do. |
| 7 | 1-amino-3-(omega-sulfoacetylamino)-benzene. | 1-amino-2.3-di-methylbenzene | Mixed urea from 2-amino-5-hydroxy-naphthalene-7-sulfonic acid and 1-amino-4-acetylaminobenzene. | Bluish bordeaux. |
| 8 | 1-amino-4-(omega-sulfopropionylamino)-benzene. | 1-amino-3-methyl-6-methoxy-benzene. | 2-(benzoylamino-4'-benzoylamino)-5-hydroxynaphthalene-7-sulfonic acid. | Violetish subdued blue. |
| 9 | 1-amino-4-(omega-sulfoacetylamino)-benzene. | do | 2-(benzoylamino-4'-benzoylamino)-5-hydroxynaphthalene-7-sulfonic acid. | Subdued bluish violet. |
| 10 | 1-amino-4-(omega-sulfoacetylamino)-5-chlorobenzene. | 1-amino-3-methyl-benzene | Mixed urea from 2-amino-5-hydroxy-naphthalene-7-sulfonic acid and 1-amino-4-acetylaminobenzene. | Ruby. |
| 11 | 1-amino-4-(omega-sulfoacetylamino)-6-chlorobenzene. | do | do | Bordeaux. |
| 12 | 1-amino-2.6-di-chloro-4-(omega-sulfoacetylamino)-benzene. | do | Mixed urea from 2-amino-5-hydroxynaphthalene-7-sulfonic acid and 1-amino-4-acetylaminobenzene. | Bluish red. |
| 13 | 1-amino-4.6-di-chloro-3-(omega-sulfoacetylamino)-benzene. | do | do | Bordeaux. |
| 14 | 1-amino-4-(omega-sulfoacetylamino)-4-methylbenzene. | 1-amino-3-methyl-benzene | 2-benzoylamino-5-hydroxynaphthalene-7-sulfonic acid. | Bluish red. |
| 15 | 1-amino-3-(omega-sulfopropionylamino)-4.6-dimethyl-benzene. | do | do | Do. |
| 16 | 1-amino-4-(omega-sulfoacetylamino)-5-methoxybenzene. | do | do | Bordeaux. |
| 17 | 1-amino-3-(omega-sulfoacetylamino)-6-chloro-4-methyl-benzene. | do | Mixed urea from 2-amino-5-hydroxy-naphthalene-7-sulfonic acid and 1-amino-4-acetyl-aminobenzene. | Do. |
| 18 | 1-amino-4-(omega-sulfoacetylamino)-2-chlorobenzene. | 1-amino-3-acetyl-aminobenzene. | 2-benzoylamino-5-hydroxynaphthalene-7-sulfonic acid. | Do. |
| 19 | 1-amino-4-(omega-sulfoacetylamino)-benzene. | 1-amino-3-acetyl-amino-6-methyl-benzene. | do | Do. |

We claim:
1. The disazo dyestuffs corresponding with the following general formula:

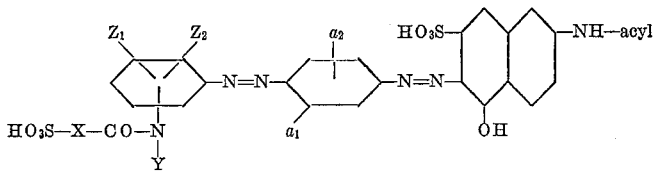

wherein the sulfoacylamino-group stands in one of the positions meta- and para- to the azo-group, X stands for a lower alkyl group, Y for a member of the group consisting of hydrogen and methyl, $Z_1$ and $Z_2$ stand for members of the group consisting of hydrogen, halogen, alkyl and alkoxy, $a_1$ stands for a member of the group consisting of methyl and acetylamino, and $a_2$ for a member of the group consisting of hydrogen, methyl and methoxy, being dark red to dark brown powders which dye vegetable fibers bluish-red to reddish-blue shades of good fastness properties, especially of very good fastness to wet-processing.

2. The disazo dyestuffs corresponding with the following general formula:

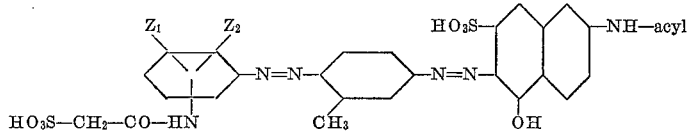

wherein the sulfoacylamino-group stands in one of the positions meta- and para- to the azo-group, X stands for a lower alkyl group, Y for a member of the group consisting of hydrogen and methyl, $Z_1$ and $Z_2$ stand for members of the group consisting of hydrogen, halogen, alkyl and alkoxy, being dark red to dark brown powders which dye vegetable fibers bluish-red to reddish-blue shades of good fastness properties, especially of very good fastness to wet-processing.

3. The disazo dyestuffs corresponding with the following general formula:

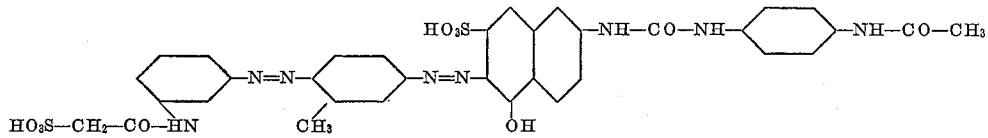

wherein the sulfoacylamino-group stands in one of the positions meta- and para- to the azo-group, $Z_1$ and $Z_2$ stand for members of the group consisting of hydrogen, halogen, alkyl and alkoxy, being dark red to dark brown powders which dye vegetable fibers bluish-red to reddish-blue shades of good fastness properties, especially of very good fastness to wet-processing.

4. The disazo dyestuff of the following formula:

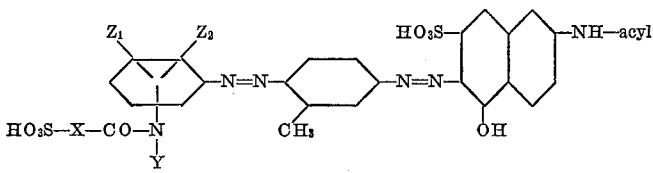

being a red powder which dyes vegetable fibers clear buish-red shades of good fastness properties, especially of very good fastness to wet-processing.

5. The disazo dyestuff of the following formula:

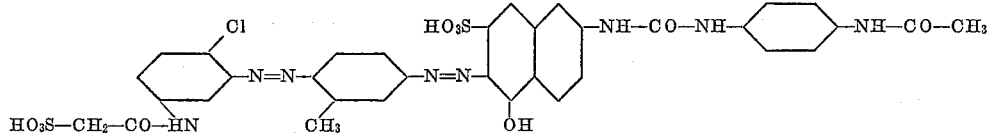

being a red powder which dyes vegetable fibers clear bluish-red shades of good fastness properties, especially of very good fastness to wet-processing.

6. The disazo dyestuff of the following formula:

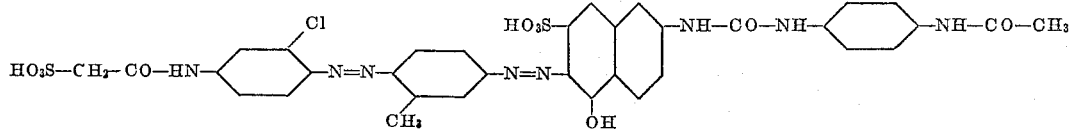

being a red powder which dyes vegetable fibers clear Bordeaux shades of good fastness properties, especially of very good fastness to wet-processing.

ERICH FISCHER.
RICHARD HUSS.